UNITED STATES PATENT OFFICE.

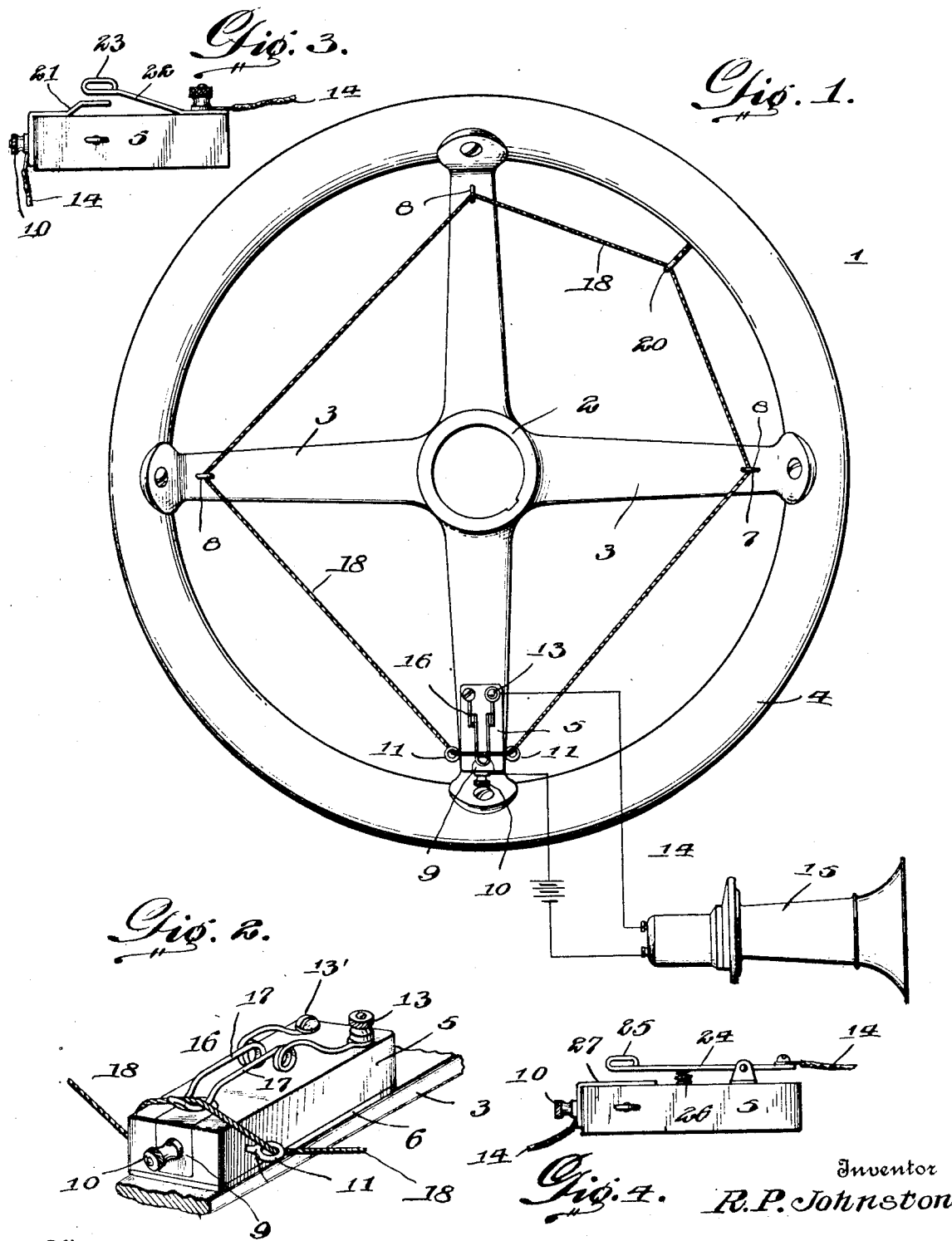

ROBERT PULLIAM JOHNSTON, OF ASHEVILLE, NORTH CAROLINA.

CIRCUIT-CLOSING DEVICE.

1,240,147.  Specification of Letters Patent.  Patented Sept. 11, 1917.

Application filed January 22, 1916. Serial No. 73,654.

*To all whom it may concern:*

Be it known that I, ROBERT PULLIAM JOHNSTON, a citizen of the United States, residing at Asheville, in the county of Buncombe and State of North Carolina, have invented new and useful Improvements in Circuit-Closing Devices, of which the following is a specification.

This invention relates to a circuit closing device which may be applied to the steering wheel of an automobile for closing the electric circuit connected with an electrically operated horn, or siren upon the automobile.

The primary object of the invention is to provide a circuit closing device of the character described which may be applied to the steering wheel of an automobile and is so constructed, that the operator of the machine may close the electric circuit connected with the horn without removing either hand from the steering wheel.

A further object of the invention is to provide the device with a continuous flexible element by means of which a normally open switch included in the electric circuit for the horn may be closed, said flexible element being attached either to the rim or spokes of the steering wheel in such a manner as to enable the tautness of the flexible element to be regulated to control the distance to which the blade of the switch may open.

Another object of the invention is to provide the device with a normally open switch having a resilient blade, an end of which is engaged with the continuous flexible element by means of which the switch is closed, said switch blade holding the flexible element taut and within easy reach of the fingers upon either hand of the operator of the machine.

A still further object of the invention is to provide the device with a continuous flexible element formed from some suitable insulating material which may be connected with the spokes or rim of the steering wheel to contact with one end of the normally open switch, so that when the flexible element is distorted by the fingers upon the hand of the operator the switch will be closed and the horn upon the machine sounded.

With these and other objects in view the invention resides in the novel combination and arrangement of parts, which will be hereinafter described and particularly pointed out in the claims.

The preferred embodiment of the invention has been illustrated in the accompanying drawings, but no restriction is necessarily made to the precise details of construction therein shown, as changes, alterations and modifications within the scope of the claims may be resorted to when desired.

In the drawings:—

Figure 1 is a bottom plan view of a steering wheel of an automobile showing the improved circuit closing device applied thereto and connected with an electric automobile horn, the electrical connection between the horn and the device being shown diagrammatically.

Fig. 2 is a detail perspective view of the normally open switch included in the circuit connected with the horn, said switch being removed from the steering wheel.

Fig. 3 is a side elevation of a modified form of switch.

Fig. 4 is a similar view showing another modified form of switch.

Like characters of reference denote corresponding parts throughout the several views in the drawings.

Referring now to the drawings in detail the numeral 1 designates the steering wheel of an automobile which as usual comprises a hub 2, spokes 3 and a rim 4.

Secured to one of the spokes 3 of the steering wheel is a block 5 between which and the spoke is a strip of insulation 6, it of course being understood that the block itself may be formed from insulating material if found desirable and that while in this instance the block 5 has been shown adjacent the rim 4 it may be positioned adjacent the hub 2 if the occasion should require.

Secured to the remaining spokes adjacent the rim by the means of threaded shanks 7 are screw eyes 8.

The block 5 is provided at one end with a contact plate 9 having a binding post 10, while extending laterally from each side of the block 5 adjacent the contact plate 9 is a screw eye 11. Mounted upon the block 5 distant from the plate 9 is a binding post 13 in alinement with a screw 13' on the block. Connected with the block 5 by means of the binding posts 10 and 13 are the terminals of the wires included in an electric circuit 14, in which is disposed the electrically operated horn 15.

In Figs. 1 and 2 in the drawing, the block 5 has mounted thereon a resilent switch 16. The switch 16 is formed from a strand of wire bent to form a U-shaped loop, the sides of which are secured at the open end of the loop to the block 5 by the binding post 13 and screw 13'. The sides of the loop are coiled between their ends, as at 17, to cause the closed end of the loop which is recessed to be normally spaced from the contact plate 9. A continuous flexible element 18 is threaded through the screw eyes 8 and 11 and has a portion thereof passed through the recess in the switch blade, so that the flexible element is normally held taut by the switch blade and may be employed to engage the switch blade with the contact plate 9 and close the electrical circuit in which is arranged the horn 15.

The flexible element 18 is passed through the eye of a screw eye 20 having its threaded shank secured in the rim of the steering wheel, so that by adjusting the shank of the screw eye within the rim the tautness of the flexible element as well as the distance which the switch blade may open may be regulated.

In the modified form of switch shown in Fig. 3 in the drawing, the contact plate 21 is bent to space a portion thereof from the block 5, said spaced portion overlapping an end of a resilient switch blade 22 connected with the block and bent to space said end which is looped, as at 23, to receive the flexible element 18, from the spaced portion of the contact plate 21.

In the modification shown in Fig. 4 in the drawing, a switch blade 24 is provided which has a rolled end 25 through which is passed the flexible element 18. A spring 26 is interposed between the switch and block 5 to hold the switch blade in spaced relation with the contact plate 27 upon the block 5.

Through the above described arrangement it will be clearly seen that when either the preferred or modified form of switch has been secured to one of the spokes in the wheel and the switch blade engaged with the flexible element 18 carried by the screw eyes 8 and 11, a pull upon the flexible element will move the switch blade into contact with the contact plate on the block 5 to close the circuit and sound the horn.

It will be also noted that the construction of the normally open switch in both the preferred and modified forms permit the switch blade to again move to an open position when the pressure upon the flexible element is released thus opening the circuit and causing the horn or siren to cease sounding.

From the foregoing description taken in connection with the accompanying drawings it will at once be apparent that a switch closing device for electrically operated horns for automobiles has been provided, which is simple in construction, inexpensive of manufacture and highly efficient in use.

Having thus described the invention what is claimed as new is:—

1. The combination with the steering wheel of a motor vehicle, of a switch block mounted upon one of the spokes of the wheel, a switch blade on said block normally held in open position, and a continuous flexible element on the steering wheel engaging said blade and operable to move the same to closed position.

2. The combination with the steering wheel of a motor vehicle, of a switch block mounted upon one of the spokes of the wheel, a continuous flexible element connected with the spokes of the wheel and crossing said block, and a resilient switch blade on said block normally in an open position and engaging said continuous flexible element to hold the same taut on the wheel.

3. The combination with the steering wheel of a motor vehicle, of a switch block mounted upon one of the spokes of the wheel, a continuous flexible element connected with the spokes of the wheel and crossing said block, a resilient switch blade on said block normally in an open position and engaging said continuous flexible element to hold the same taut on the wheel, and means for regulating the tautness of said continuous flexible element.

4. The combination with the steering wheel of a motor vehicle, of a switch block mounted upon one of the spokes of the wheel, screw eyes connected with the spokes and the sides of said switch block, a continuous flexible element threaded through said eyes and crossing said block, a resilient switch blade on the block normally in an open position and having an end engaged with the continuous flexible element to hold the same taut upon the wheel, and a screw eye mounted in the rim of the wheel and engaged with the continuous flexible element.

In testimony whereof I affix my signature in presence of two witnesses.

ROBERT PULLIAM JOHNSTON.

Witnesses:
J. W. RUTHERFORD,
J. P. McLAIN.